UNITED STATES PATENT OFFICE.

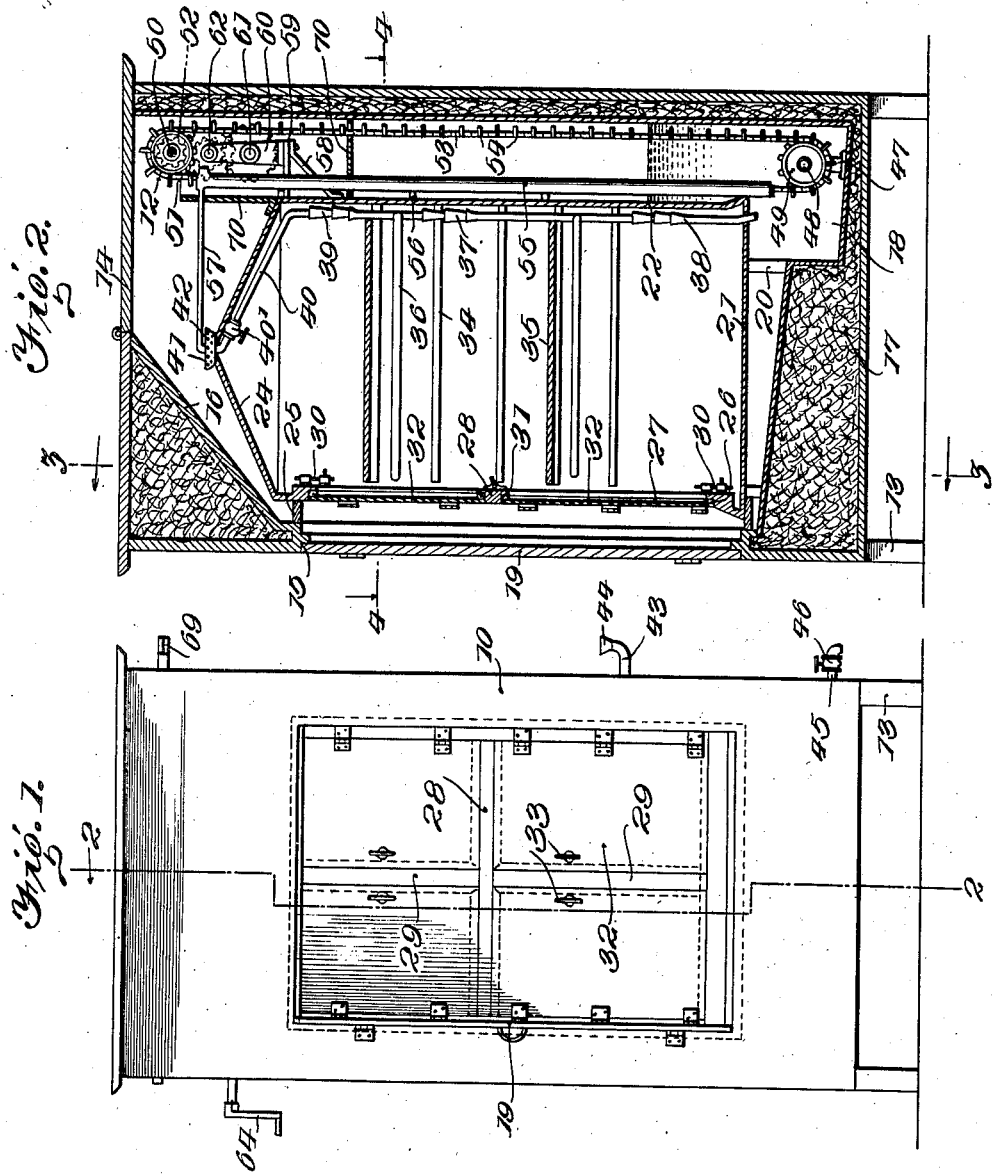

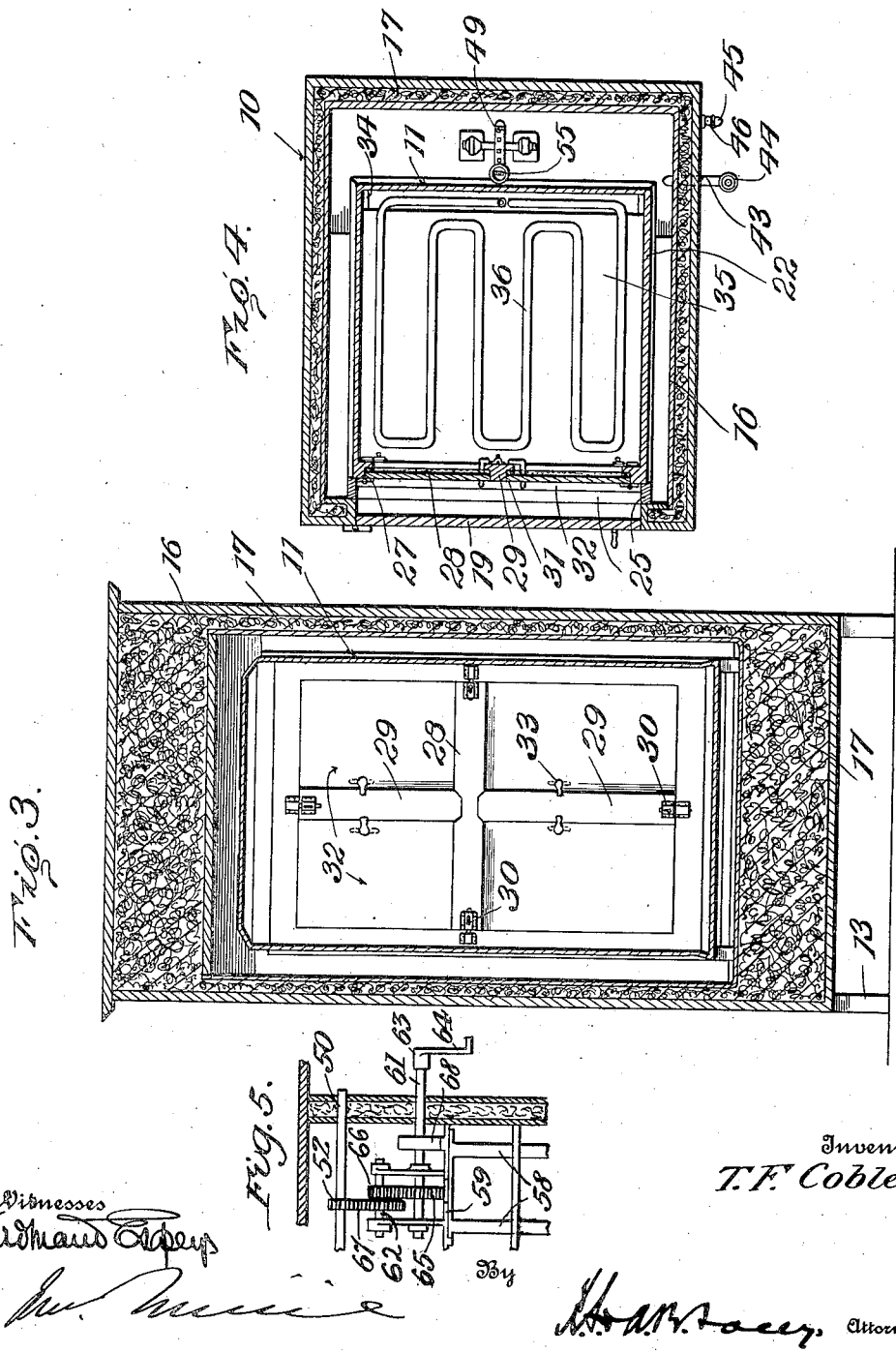

THOMAS F. COBLER, OF LEAVENWORTH, KANSAS.

REFRIGERATOR.

1,116,802. Specification of Letters Patent. Patented Nov. 10, 1914.

Original application filed October 28, 1912, Serial No. 728,220. Divided and this application filed July 8, 1913. Serial No. 777,936.

*To all whom it may concern:*

Be it known that I, THOMAS F. COBLER, citizen of the United States, residing at Leavenworth, in the county of Leavenworth and State of Kansas, have invented certain new and useful Improvements in Refrigerators, of which the following is a specification.

My invention relates to new and useful improvements in refrigerators and more particularly in the present invention covers the body construction proper of a refrigerator adapted to be cooled by water circulation, the method of cooling the refrigerator being fully set forth in my copending applications filed by me, one of which bears Serial No. 728,220 and filing date October 28, 1912, and the other of which bears Serial No. 777,935 and filing date July 8, 1913.

The object of my present invention is to provide an improved form of refrigerator having an outer casing and an inner food holding chest positioned within the outer casing with its walls spaced therefrom, the outer casing being so arranged as to protect the inner casing from heat and also being so constructed with respect to the inner casing or food holding receptacle that although water is constantly poured over the latter none of it will escape through the door opening of the outer casing.

A further object of my invention is to so mount the outer casing within the inner casing that all flow of water over the inner casing will be deflected from the door opening thereof as well as from the door opening of the outer casing. And a still further object of my invention is to provide the inner or food holding receptacle of the refrigerator with a novel form of door construction by means of which a single large door opening may be closed by a plurality of small doors in such a manner that in service any one of the smaller doors may be opened leaving the remainder of the door opening closed.

In this connection, a still further object of my invention is to so mount the doors in the door opening that all the doors and the supporting frame therefor may be removed from the door opening for convenience in cleansing the interior of the food holding receptacle.

With these and other objects in view, my invention will be more fully described, illustrated in the accompanying drawings, and then specifically pointed out in the claims which are attached to and form a part of this application.

In the drawings: Figure 1 is a front elevation of my improved refrigerator with the outer door open; Fig. 2 is a vertical section taken on the line 2—2 of Fig. 1; Fig. 3 is a vertical sectional view taken on the line 3—3 of Fig. 2, looking in the direction of the arrows; Fig. 4 is a horizontal section on the line 4—4 of Fig. 2, also looking in the direction of the arrows. Fig. 5 is a detail elevational view of the pump operating mechanism, portions of the refrigerator casing being shown in section.

Corresponding and like parts are referred to in the following description and indicated in all the views of the drawings by the same reference characters.

The preferred embodiment of my invention consists primarily of an outer casing 10 furnishing a reservoir for the cooling fluid and a housing for the inner casing or food holding chest proper 11 and also for the pump mechanism, designated as a whole by the numeral 12 which is employed for maintaining a proper circulation of the cooling fluid over the inner chest and through the cooling coils, as will be hereinafter fully explained.

The outer casing 10 is preferably formed of wood and is substantially rectangular in shape as shown, being supported in slightly raised position by feet 13. The top of this outer casing is provided with a hinged cover 14 and the entire casing, with the exception of the cover portion and the door opening 15, is provided with a lining 16 preferably formed of sheet metal with all joints soldered or otherwise rendered water tight. This lining is in all cases spaced from the outer wall and the spaces thus formed are filled with a packing 17 of mineral wool, sawdust, or other suitable non-heat conducting material. As best shown in Fig. 2 of the drawings, the base portion of this lining 16 is inclined from the bottom of the door opening downwardly and rearwardly to cause all water falling upon the base to flow to the rear of the casing. The bottom lining at the rear of the casing is further lowered to provide a well or reservoir 18 to receive the lower part of the pump mechanism, as will be hereinafter explained. This outer casing 10 is normally closed by a door 19 which is preferably mounted upon hinges and which closes the entire door opening. Mounted upon suitable supporting legs 20 within this outer casing, is the inner water tight casing 11 which forms the food receiving chest of the refrigerator. The bottom 21 of this inner casing is spaced above the lining of the outer casing, as shown, while the side walls 22 and rear wall of the inner casing are flared slightly at their lower edges, as shown at 23 to break the fall of water flowing down the outer face of said walls and so prevent undue splashing from the same. The top 24 of the inner casing is inclined from the center toward the side walls of the front and rear walls of the casing, as shown in Figs. 2 and 3 of the drawings and it will therefore be apparent that water flowing upon the top of the inner casing will run evenly from the top and down the side and rear walls of the casing. Water is prevented from flowing over the front wall of the casing by a flange 25 which completely surrounds the door opening 26 formed in the front wall of the inner casing and registering with the door opening 15 of the outer casing. The free edges of this flange are preferably soldered to the lining of the outer casing to absolutely prevent all leakage of water through the door opening and also to serve as a brace for supporting the inner casing or chest in position.

The jambs of the door opening 26 are provided throughout their entire extent with a packing 27 of rubber or other suitable material and the door opening is divided into sections by a transverse sash bar 28 and vertical sash bars 29, the ends of which are secured in place by catches 30, these sash bars therefore being removable to permit ready access to the chest for cleaning purposes. The jambs of these sash bars are also provided with packing strips 31 corresponding to the packing strips 27 of the door jambs proper and a plurality of hinged doors 32 are mounted in the door opening and co-act with the sash bars to form a closure for the inner casing, these doors being provided with latches 33 of any suitable type for securing the doors in closed position. It will therefore be apparent that any one of these doors may be opened to permit access to a certain part of the chest without opening the chest up wide and exposing its contents to the warmer outside air. It will also be apparent that all of the doors may be opened and the sash bars removed to permit changing of the shelves within the chest or the cleaning of said chest.

The side walls of the chest 11 are provided interiorly with spaced ledges 34 supporting shelves 35. These ledges may be formed of wood, but preferably consist of strips of angle iron and are so arranged that the shelves may be supported at various heights within the chest, as desired. Positioned beneath each of the shelves 35, is a cooling coil 36, these coils being connected by a telescopic pipe member 37, the parts of which fit closely to prevent leakage, while at the same time permitting the raising and lowering of the coils within the chest. The lowermost coil 36 is provided with an outlet pipe 38 which extends through the bottom 21 of the chest and the topmost coil is provided with a second telescopic inlet pipe 39 which in turn is connected to one end of a pipe 40, the opposite end of which leads through the central portion of the top 24 of the chest, communicating with a water distributing vessel 41 supported upon said top and having its walls perforated upon all sides, as shown at 42 to provide passage for water from the vessel to the chest top from which it will flow over the side and rear walls of the chest, as previously described. The pipe 40 is provided with a valve 40'.

By providing the telescopic connections above described, the position of the coils may be readily adjusted within the chest and with respect to each other to bring the same immediately below the shelves, irrespective of the position of the shelves within the chest.

The outer casing 10 is provided intermediate its height with an intake pipe 43, the outer end of which is funnel-shaped as shown at 44 and with an outlet pipe 45 leading from the lower portion of the reservoir 18 and provided with a cut-off valve 46. The water contained within the reservoir is drained at suitable intervals through the pipe 45 and colder, fresh water supplied in its place through the pipe 43.

In order to provide means for raising the water from the well or reservoir 18 to the distributing vessel 41, I provide bearings 47 in which is journaled a shaft 48 carrying a sprocket gear 49 and a second shaft 50 extending transversely of the rear portion of the refrigerator and journaled in bearings formed in the walls of the outer casing. Keyed upon this second shaft, is a sprocket gear 51 and a pinion 52. Trained about the sprocket gears 49 and 51, is a pump chain 53 having the usual water lifting cups 54, the chain at one side passing through the vertically disposed pump cylinder 55 which is supported in place by brackets 56 extending from the chest 11. The pump thus formed is positioned at the rear of the chest and centrally between the sides thereof, as best shown in Fig. 4 of the drawings. Leading from the upper end of the pump cylinder 55, is a spout 57 which discharges in the distributing vessel 41.

Brackets 58 carried by the upper portion of the rear wall of the chest 11, support a shelf 59 carrying bearings 60 in which are journaled parallel shafts 61 and 62, one end of the first mentioned shaft extending through the outer wall of the refrigerator and having a squared terminal 63 to receive a hand crank 64. Keyed upon the shaft 61, is a gear 65 which meshes with a pinion 66 keyed upon the shaft 62 and a gear 67 also keyed upon the shaft 62 meshes with the pinion 52 of the pump shaft 50. A heavy coiled spring 68 is wound about the shaft 61, one end of the spring being secured to the shaft, while the opposite end is secured to the shelf 59.

From the foregoing description, it will be apparent that the shaft 61 may be rotated by the hand crank 64 to wind the spring 68, and that the power derived from this spring will be transmitted through the gears above described to rotate the pump shaft 60 and so operate the pump. The spring 68, gears and pump should be so related that the spring when once wound will drive the pump at a suitable rate of speed for at least twenty-four hours.

In order to provide means for starting the pump, after winding the spring, in case its initial strength is not sufficient to overcome the inertia of the pump mechanism, I have extended one end of the pump shaft 50 beyond the outer casing of the refrigerator and provided it with a squared terminal 69 also adapted to receive the hand crank 64, thus providing means for starting the pump manually.

A shield 70 of sheet metal, is preferably provided about the gears to protect the same from moisture and also to prevent any dripping of oil from the gears to the water contained in the well or reservoir.

From the foregoing description, taken in connection with the drawings, the construction of my improved refrigerator will be readily understood as will also the operation of the pump and its mechanism in maintaining the required circulation of water through the cooling coil and about the food holding chest of the refrigerator.

It will of course be understood that minor changes in details of construction may be made, if desired, without in the slightest degree departing from the spirit of my invention.

Having thus described the invention, what is claimed as new is:

1. A refrigerator including inner and outer casings spaced from each other and provided with alined door openings, a sash bar extending transversely of the opening in the inner casing with its ends detachably secured thereto, vertical sash bars having detachable locking engagement at their adjacent ends with the intermediate portion of the first sash bar and at their outer ends with the inner casing, and a plurality of doors mounted to close the resultant door openings formed by the sash bars.

2. A refrigerator including an outer casing having a door opening and a door therefor, a food holding receptacle positioned within the casing and having a door opening, a flange surrounding the door opening of the receptacle and the door opening of the casing, sash bars extending vertically and transversely of the door opening of the receptacle, means for detachably securing said sash bars in place, and a plurality of doors hinged in the door opening of said receptacle and seating, when closed, against the sash bars, the sash bars being provided with packing strips against which the doors engage while the door opening is provided with packing strips against which the sash bars engage.

3. A refrigerator including inner and outer casings spaced from each and provided with alined door openings, a closure for the outer casing, a sash bar extending transversely of the opening in the inner casing, latches detachably securing the ends of such sash bar to the inner casing, vertical sash bars having detachable locking engagement at their adjacent ends with the intermediate portion of the first sash bar, latches detachably locking their opposite ends to the inner casing, and a plurality of doors mounted to close the resultant door openings formed by the sash bars.

In testimony whereof I affix my signature in presence of two witnesses:

THOMAS F. COBLER. [L. S.]

Witnesses:
  ALBERT LANGE, Jr.,
  H. M. SPRINGER.